(12) United States Patent
Shibata et al.

(10) Patent No.: US 6,381,429 B1
(45) Date of Patent: Apr. 30, 2002

(54) METHOD FOR FIXING BEARING MEMBER FOR CYLINDRICAL SUBSTRATE, STRUCTURE FOR FIXING BEARING MEMBER FOR CYLINDRICAL SUBSTRATE, ELECTROPHOTOGRAPHIC PHOTORECEPTOR HAVING BEARING MEMBER, PRINT CARTRIDGE, AND APPARATUS FOR FORMING IMAGE

(75) Inventors: Junichi Shibata, Minamiashigara; Takashi Kanagawa, Ebina, both of (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/668,735

(22) Filed: Sep. 25, 2000

(30) Foreign Application Priority Data

Mar. 3, 2000 (JP) .............................. 12-059255

(51) Int. Cl.[7] .............................................. G03G 15/00
(52) U.S. Cl. ..................................... 399/117; 29/895.22
(58) Field of Search .................................. 399/117, 159, 399/167; 29/895.22, 895.2, 895; 492/16, 18, 47

(56) References Cited

U.S. PATENT DOCUMENTS

| | | | | |
|---|---|---|---|---|
| 2,891,301 A | * | 6/1959 | Conklin | |
| 4,527,883 A | * | 7/1985 | Kamiyama | 399/117 |
| 4,561,763 A | * | 12/1985 | Basch | 399/116 |
| 5,579,093 A | * | 11/1996 | Wagner et al. | 399/159 |
| 5,630,196 A | * | 5/1997 | Swain | 399/117 |
| 5,655,182 A | * | 8/1997 | Sanchez et al. | 399/117 |
| 6,002,897 A | * | 12/1999 | Kohno et al. | 399/117 |

* cited by examiner

Primary Examiner—Robert Beatty
(74) Attorney, Agent, or Firm—Oliff & Berridge, PLC (57) ABSTRACT

A method for fixing and a structure for fixing a bearing member for a cylindrical substrate, a print cartridge and an apparatus for forming an image are provided, in which the deflection precision of the cylindrical substrate, such as an electrophotographic photoreceptor, is improved. A cylindrical substrate is expanded toward the outer periphery based on the expanding function caused by elasticity of a first inserting member and a second inserting member upon inserting into the cylindrical substrate from ends of the cylindrical substrate, so as to clamp the cylindrical member and bearing members interdigitated on the outer periphery of the cylindrical substrate. A second inserting member is inserted into the first inserting member.

10 Claims, 6 Drawing Sheets

METHOD FOR FIXING BEARING MEMBER FOR CYLINDRICAL SUBSTRATE, STRUCTURE FOR FIXING BEARING MEMBER FOR CYLINDRICAL SUBSTRATE, ELECTROPHOTOGRAPHIC PHOTORECEPTOR HAVING BEARING MEMBER, PRINT CARTRIDGE, AND APPARATUS FOR FORMING IMAGE

FIELD OF THE INVENTION

The present invention relates to a method for fixing a bearing member for a cylindrical substrate, a structure for fixing a bearing member for a cylindrical substrate, an electrophotographic photoreceptor having a bearing member, a print cartridge, and an apparatus for forming an image.

BACKGROUND OF THE INVENTION

In general, a cylindrical electrophotographic photoreceptor has been produced forming a photosensitive layer on an outer periphery of a cylindrical substrate formed of aluminum or an aluminum alloy, and interdigitating a fitting called a flange formed of a resin and an aluminum alloy on one end or both ends thereof by adhesion or other measures, and has been used while the flange is a rotation center.

In recent years, duplicators and printers are generally demanded to print a color image and a high quality image, and commercially available products are having such capabilities of a color image and a high quality image. According to the trend, in an apparatus for forming an image employing an electrophotographic photoreceptor, the electrophotographic photoreceptor constituting a core component thereof is demanded to have higher deflection precision on rotation.

Figure 6A:
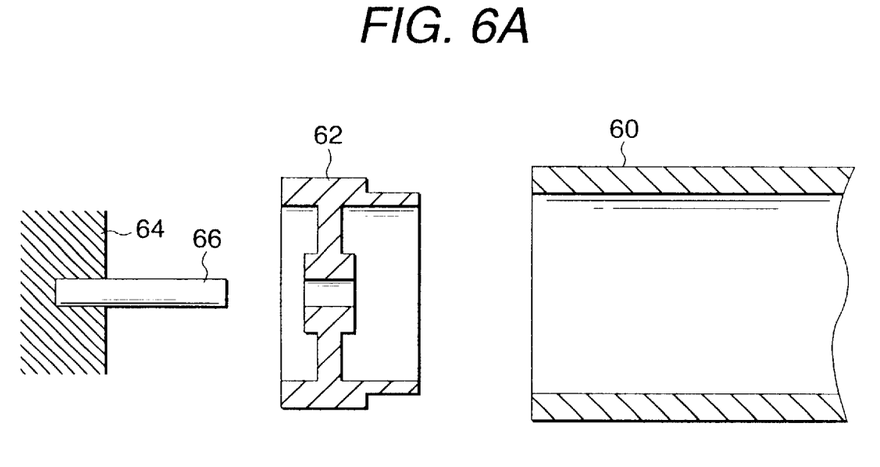
FIG. 6A is an exploded view showing an example of the conventional electrophotographic photoreceptor having a flange.
Figure 6B:
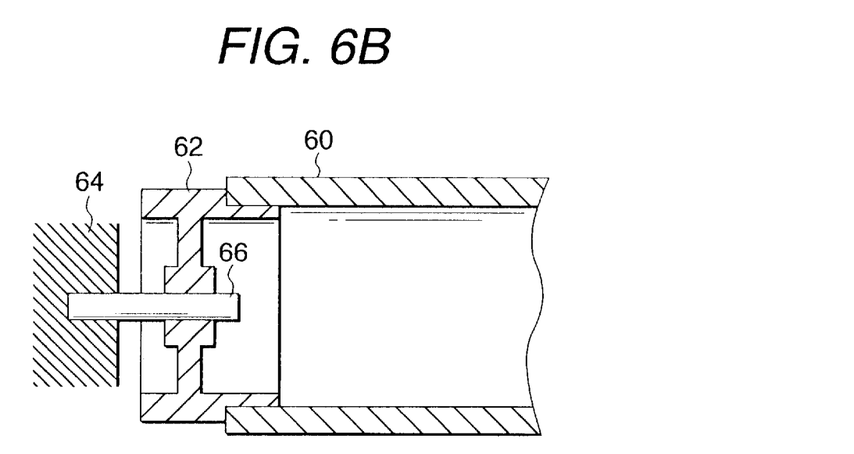
FIG. 6B is an exploded view showing an example of the structure for fixing the conventional electrophotographic photoreceptor having a flange.

In a conventional electrophotographic photoreceptor having a flange, as shown in FIGS. 6A and 6B, a flange 62 is interdigitated on an end of an electrophotographic photoreceptor 60, a hole is formed at the central part of the flange 62, and an axis member 66 fixed on a supporting member 64 is inserted into the hole to support the electrophotographic photoreceptor 60 freely rotatable. Alternatively, while not shown in the figures, an axis member 66 is fixed at the central part of the flange 62, and the axis member 66 is supported by a hole provided in a support member 64 freely rotatable.

The electrophotographic photoreceptor having a flange has the following problems.

(1) Because the photosensitive layer is formed on the outer periphery of the electrophotographic photoreceptor, and the flange is interdigitated into the inner surface thereof, it has a coaxiality error caused by the difference between the outer periphery and the inner surface of the substrate.

(2) The flange has the hole or the axis united with the flange, which becomes the rotation center of the electrophotographic photoreceptor having the flange. Therefore, in the case where the hole is formed, it has a coaxiality error caused by the difference between the outer periphery and the inner surface of the flange, and in the case where the axis is united with the flange, it has a coaxiality error caused by the difference between the outer diameter of the axis and the outer diameter of the interdigitating part of the flange.

(3) It has an error caused by the difference between the inner diameter of the electrophotographic photoreceptor and the outer diameter of the interdigitating part of the flange, and thus the interdigitation is imperfect.

(4) The electrophotographic photoreceptor having a flange formed by interdigitating the flange and the electrophotographic photoreceptor united with each other is installed in a print cartridge while the hole or the axis of the flange is the rotation center, so as to constitute an apparatus for forming an image by an electrophotographic imaging process. Therefore, in the case where the electrophotographic photoreceptor having the flange slides by rotation, it causes a coaxiality error caused by the difference between the inner diameter and the outer diameter thereof.

(5) The conventional technique involves a number of factors causing a rotation error although it is constituted with a small number of components, and there is a limitation in improving the precision in rotation deflection by a method of low cost.

(6) Because the flange is fixed to the electrophotographic photoreceptor by a measure, such as adhesion or crimping, it is extremely difficult to reuse the electrophotographic photoreceptor and the flange by detaching. Furthermore, it is difficult to shorten the time required for the operation of interdigitating and fixing the flange to the electrophotographic photoreceptor, and an apparatus for interdigitating and fixing the flange to the electrophotographic photoreceptor is complex and expensive.

SUMMARY OF THE INVENTION

The invention has been made to solve the problems associated with the conventional techniques and provides the following.

(1) The invention relates to, as an aspect, a method for fixing a bearing member for a cylindrical substrate containing a step of inserting an inserting member into a cylindrical substrate from an end of the cylindrical substrate to expand the cylindrical substrate in a direction toward an outer periphery thereof by an expanding function in a diameter direction caused by elasticity of the inserting member, whereby the cylindrical substrate and a bearing member interdigitated on an outer periphery of the cylindrical substrate are clamped on each other.

(2) The invention also relates to, as another aspect, a structure for fixing a bearing member for a cylindrical substrate containing a cylindrical substrate, an inserting member having an expanding function in a diameter direction caused by elasticity thereof upon inserting in the cylindrical substrate from an end of the cylindrical substrate, and a bearing member interdigitated on an outer periphery of the cylindrical substrate.

(3) The invention relates to, as still another aspect, an electrophotographic photoreceptor having a bearing member containing an electrophotographic photoreceptor, an inserting member having an expanding function in a diameter direction caused by elasticity thereof upon inserting in the electrophotographic photoreceptor from an end of the electrophotographic photoreceptor, and a bearing member interdigitated on an outer periphery of the electrophotographic photoreceptor.

(4) The invention also relates to, as a further aspect, a print cartridge having the electrophotographic photoreceptor having a bearing member according to the invention installed therein.

(5) The invention also relates to, as a still further aspect, an apparatus for forming an image having the electrophotographic photoreceptor according to the invention.

In the invention, clamping of the cylindrical substrate and the bearing member interdigitated on an outer periphery of the cylindrical substrate is attained by expanding the cylindrical substrate in the direction toward the outer periphery thereof based on the expanding function in the diameter direction caused by elasticity of the inserting member upon inserting in the cylindrical substrate form an end of the cylindrical substrate.

BRIEF DESCRIPTION OF THE DRAWINGS

A preferred embodiment of the invention will be described in detail based on the following figures, wherein.

DESCRIPTION OF THE PREFERRED EMBODIMENT

A preferred embodiment of the invention will be described below.

Figure 1:
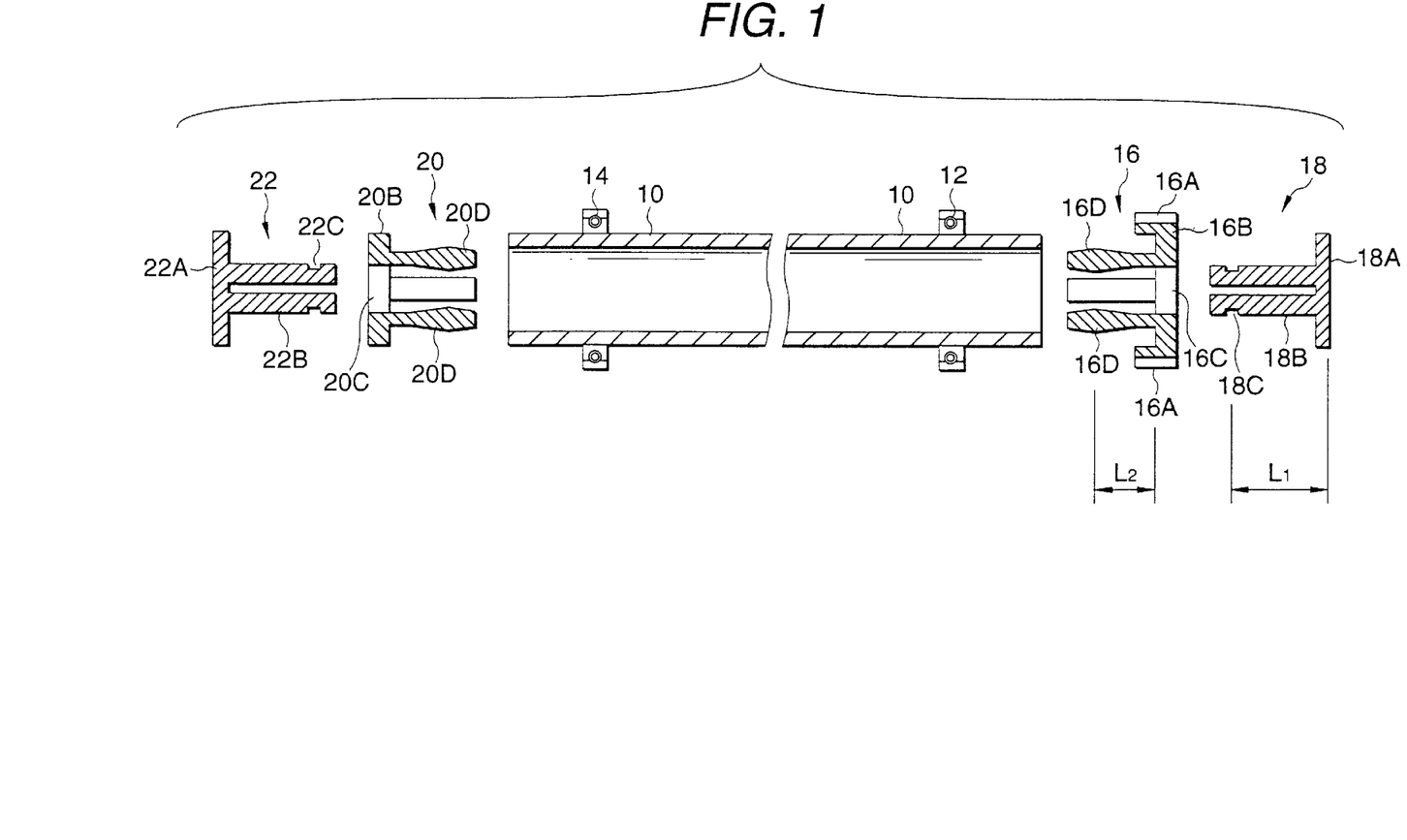
FIG. 1 is an exploded view showing one embodiment of the method for fixing a bearing member for a cylindrical substrate according to the invention.

FIG. 1 is an exploded view showing one embodiment of the method for fixing a bearing member for a cylindrical substrate according to the invention, which shows an example where the cylindrical substrate is an electrophotographic photoreceptor. In FIG. 1, bearing members 12 and 14 are interdigitated on the vicinities of both ends of the electrophotographic photoreceptor 10 by transition fitting. At one end of the electrophotographic photoreceptor 10, a first inserting member 16 and a second inserting member 18 are prepared. On the other end of the electrophotographic photoreceptor 10, a third inserting member 20 and a fourth inserting member 22 are prepared.

The first inserting member 16 has, on an outer periphery thereof, a gear main substrate 16B in a disk form having a gear part 16A formed thereon, which engages with a driving worm gear not shown in the figure, and a circular opening 16C is formed at a central part of the gear main substrate 16B. In the outer periphery of the circular opening 16C, four bar members 16D are provided to stand on the gear main substrate 16B at even intervals. The third inserting member 20 has the same constitution as the first inserting member 16 except that it does not have the gear part 16A in the first inserting member 16, and the bar members 16D of the first inserting member 16 have the same constitution as bar members of the third inserting members 20.

Figure 2A:
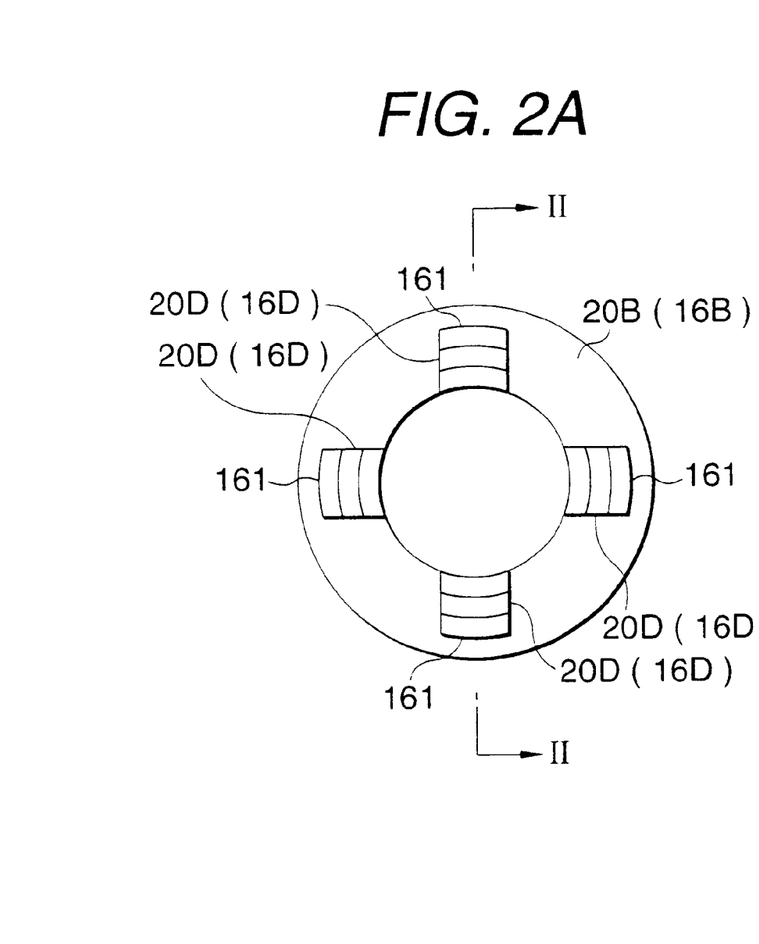
FIG. 2A is a plan view showing the third inserting member in the invention.
Figure 2B:
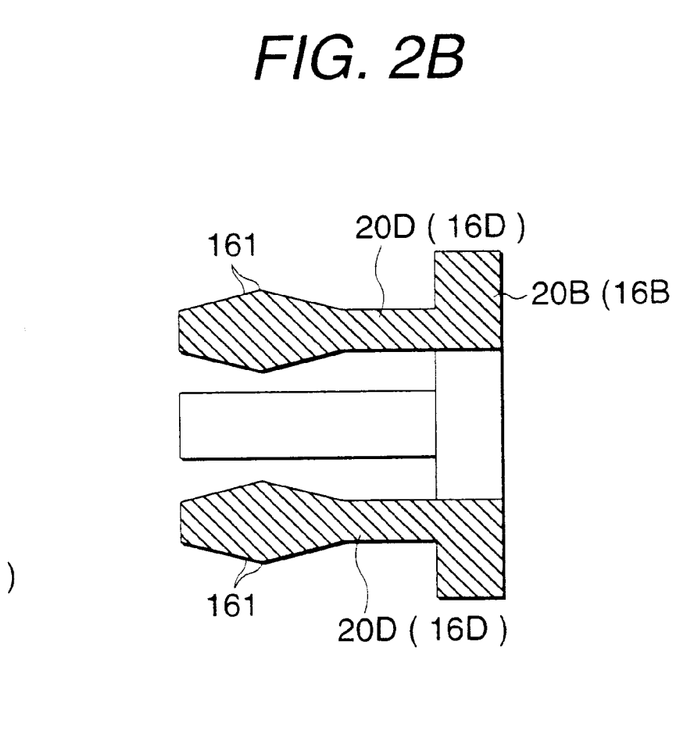
FIG. 2B is a cross sectional view of the same on line II—II in FIG. 2A.

Therefore, the third inserting member 20 will be described with reference to FIGS. 2A and 2B, and constitutional components of the first inserting member 16 corresponding to constitutional components of the third inserting member 20 will be appended inside parentheses.

The four bar members 20D (bar members 16D) provided to stand on the circular main substrate 20B (gear main substrate 16B) of the third inserting member 20 are each formed in such a manner that the thickness thereof is firstly gradually increased from the tip end toward the main substrate 20B (gear main substrate 16B), and through a maximum thickness part 161, the thickness is then gradually decreased toward the main substrate 20B (gear main substrate 16B). The maximum thickness parts 161 of the four bar members are formed at the positions of the same distances from the main substrate 20B (gear main substrate 16B).

The second inserting member 18 has a circular main substrate 18A having a cylindrical part 18B formed at the central part thereof, and a groove 18C is formed around an outer periphery of the cylindrical part 18B, in which the distance ($L_1$) from the main substrate 18A to the central part of the groove 18C is the same as the distance ($L_2$) from the bottom surface of the gear main substrate 16B to the maximum thickness part 161 of the first inserting member. The fourth inserting member 22, which has the same constitution as the second inserting member 18, has a cylindrical part 22B formed at the central part a circular main substrate 22A, and a groove 22C is formed around an outer periphery of the cylindrical part 22B, in which the distance ($L_1$) from the main substrate 22A to the central part of the groove 22C is the same as the distance ($L_2$) from the bottom surface of the main substrate 20B to the maximum thickness part 161 of the first inserting member.

The method for fixing a bearing member according to the invention will be described with reference to the drawings.

Figure 3:
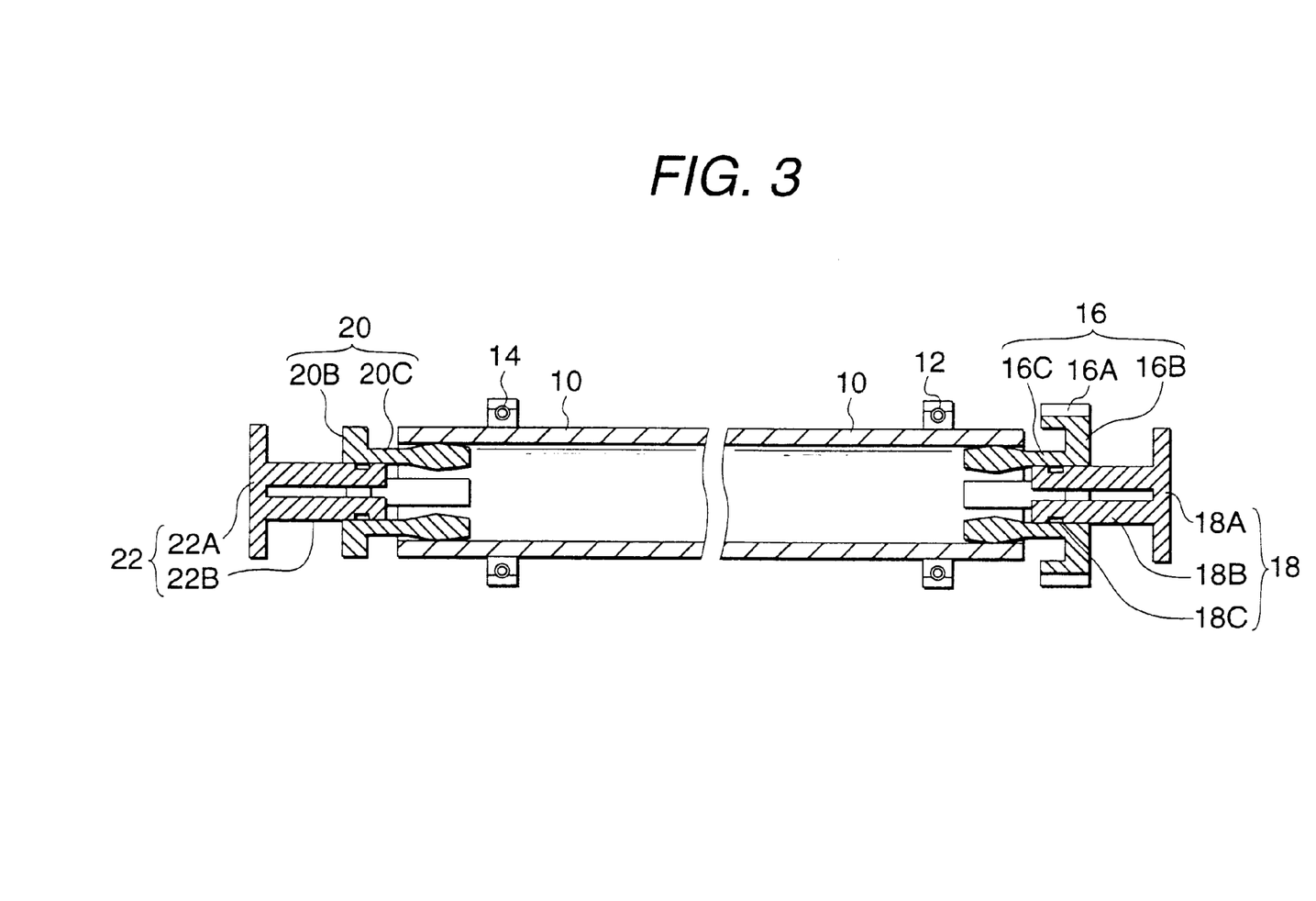
FIG. 3 is an assembling view showing one embodiment of the method for assembling the bearing member for a cylindrical substrate according to the invention.

As shown in FIG. 3, the first inserting member 16 and the third inserting member 20 are inserted into the both ends of the electrophotographic photoreceptor 10, respectively. At this time, the maximum thickness parts 161 of the respective bar members of the first inserting member 16 are in a condition where they are in contact with the inner surface of the electrophotographic photoreceptor 10. Similarly, the maximum thickness parts 161 of the respective bar members of the third inserting member 20 are in a condition where they are in contact with the inner surface of the electrophotographic photoreceptor 10.

The cylindrical part 18B of the second inserting member 18 is then inserted into the opening 16C of the first inserting member 16, and the cylindrical part 22B of the fourth inserting member 22 is inserted into the opening 20C of the third inserting member 20. The first inserting member 16 and the second inserting member 18 are then pressed together into the electrophotographic photoreceptor 10, and the third inserting member 20 and the fourth inserting member 22 are pressed together into the electrophotographic photoreceptor 10.

When the second inserting member 18 is inserted into the first inserting member 16, the cylindrical part 18B of the second inserting member 18 moves along the inner surface of the bar members 16D of the first inserting member 16, so as to expand the four bar members 16D toward the inner surface of the electrophotographic photoreceptor 10 by the elasticity of the four bar members 16D. When the maximum thickness parts 161 of the bar members 16D are interdigitated in the groove 18C of the cylindrical part 18B, the expanding function of the bar members 16D toward the inner surface of the electrophotographic photoreceptor 10 becomes the maximum.

Figure 4:
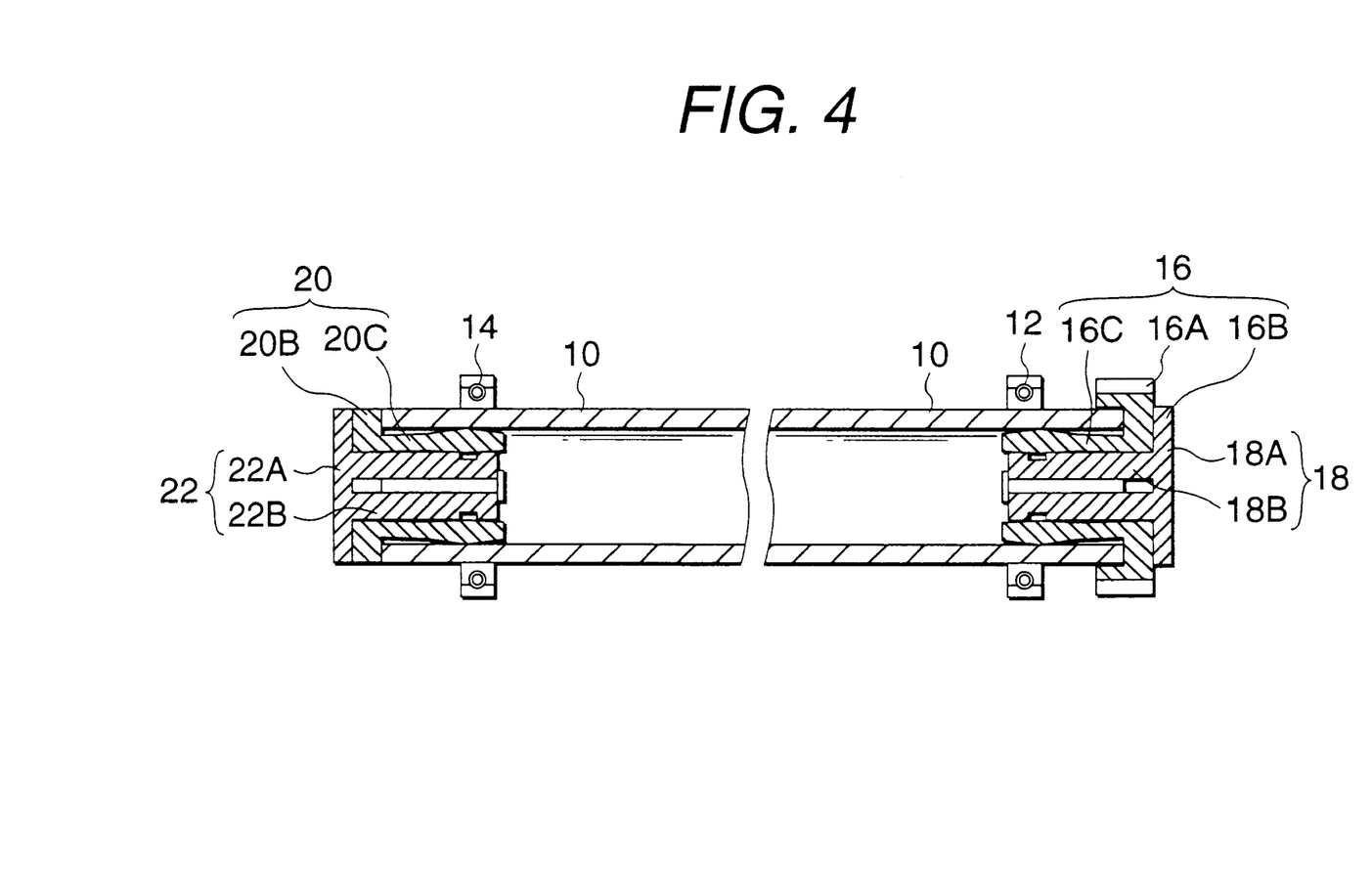
FIG. 4 is a cross sectional view showing one embodiment of the structure for fixing a bearing member for a cylindrical substrate according to the invention.

Therefore, a part at one end in the axial direction of the electrophotographic photoreceptor 10 is expanded in the diameter direction, and the bearing member 12 interdigitated by transition fitting on the vicinity of one end in the axial direction of the electrophotographic photoreceptor 10 is fixed to the electrophotographic photoreceptor 10 by clamping. Similarly, the other end in the axial direction of the electrophotographic photoreceptor 10 is expanded in the diameter direction by inserting the third inserting member 20 and the fourth inserting member 22 into the electrophotographic photoreceptor 10, and thus the bearing member 14 interdigitated by transition fitting on the side of the other end in the axial direction of the electrophotographic photoreceptor 10 is fixed to the electrophotographic photoreceptor 10 by clamping.

Figure 5A:
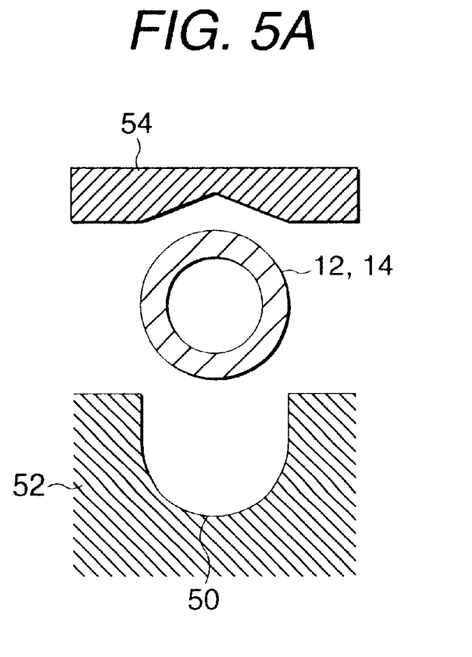
FIG. 5A is a cross sectional view of an important part showing an example where the electrophotographic photoreceptor having a bearing member according to the invention is installed in a cartridge.
Figure 5B:
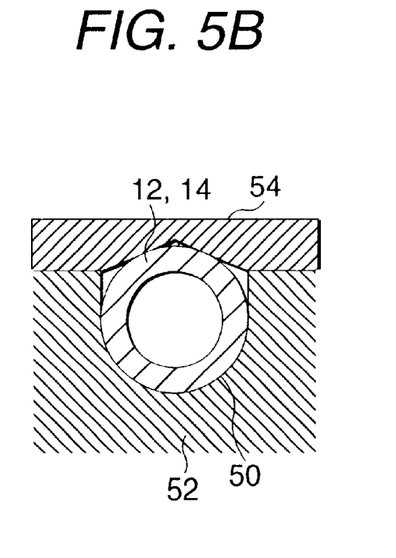
FIG. 5B is a cross sectional view of an important part showing an example of the electrophotographic photoreceptor having a bearing member according to the invention having been installed in a cartridge.

The electrophotographic photoreceptor having the bearing members clamped thereon is installed in a print cartridge. As shown in FIGS. 5A and 5B, the print cartridge has a pair of supporting members 52 each having a groove 50 (only one of the supporting members is shown in the figure), and the bearing members 12 and 14 clamped on the electrophotographic photoreceptor 10 are interdigitated on the grooves 50. Screw holes are provided on both sides of the groove 50, and the bearing members 12 and 14 are each retained with a retaining member 54, which is fixed with screws, so as to support the electrophotographic photoreceptor 10 freely rotatable on the supporting members 52 via the bearing members 12 and 14. A gap of about 0.5 mm is provided between the supporting member 52 and the retaining member 54. The electrophotographic photoreceptor 10 is rotatable through a driving transmission gear (not shown in the figure) engaging with the gear part 16A of the first inserting member 16 interdigitated on the electrophotographic photoreceptor 10.

The apparatus for forming an image according to the invention is preferably a tandem type image forming apparatus having a plurality of the electrophotographic photoreceptors having the bearing members installed thereto. The tandem type image forming apparatus contains, for example, four image forming units forming toner images of four color components, i.e., yellow, magenta, cyan and black, and a belt transporting device transporting a recording material arranged at the position facing the respective image forming units. The image forming apparatus also contains a developer supplying device and a fixing device for fixing the color toner images.

In the embodiment described in the foregoing, the first inserting member and the third inserting member may have other constitutions, in addition to the form of the bar members shown in the figures, that expand by the insertion thereof the second and fourth inserting member toward the inner surface of the electrophotographic photoreceptor to expand the electrophotographic photoreceptor in the diameter direction by the elastic function thereof. Therefore, for example, the maximum thickness part of the bar member may have a triangular cross section or a substantially semielliptic cross section. Furthermore, the number of the bar members of the first and third inserting members may not be necessarily four but three and five or more. In these cases, it is preferred that the bar members are provided at even intervals.

The first and third inserting members may have, instead of the bar members, a cylindrical substrate having a taper on the inner surface in the axial direction (inserting direction of the inserting member) or having a maximum thickness part, but because a large force is required to expand the cylindrical substrate in the diameter direction in this case, it is preferred to provide plural bar members.

Because the first and third inserting members necessarily have a function of expanding in the diameter direction by the elastic behavior thereof, and also from the standpoint of snap-on action, they are preferably formed with a polyacetal resin, a nylon resin or a polycarbonate resin.

Because the second and fourth inserting members necessarily maintain the form thereof for a long period of time after expanding the first and third inserting members, it is preferred that the groove is formed on the cylindrical part. The groove may be a concave part having a semicircular cross section, in addition to a concave part having a rectangular cross section. The second and fourth inserting members necessarily have a necessary and sufficient rigidity, and while they may be formed with a resin and a metal, it is preferred that they are formed with a resin, such as a polyacetal resin, a nylon resin or a polycarbonate resin.

The bearing member may be those commercially available including a ball bearing, a needle bearing and others.

The print unit, to which the electrophotographic photoreceptor having a bearing member can be mounted, is not particularly limited in the material thereof, and it is preferably formed with a resin from the standpoint of formability and cost. Examples of the resin include an ABS resin and a polycarbonate resin.

In the embodiment described in the foregoing, the bearing member 12 can be stably and firmly fixed to the electrophotographic photoreceptor 10 only with the two inserting members by a simple operation where the inserting members are inserted into an end of the electrophotographic photoreceptor 10. The bearing member 14 can also be stably and firmly fixed to the electrophotographic photoreceptor 10 in the similar manner.

The error forming factors of the conventional parts including an electrophotographic photoreceptor, a flange and a print cartridge (shown in Table 1) and the error forming factors of the parts of the invention including an electrophotographic photoreceptor, a bearing member and a print cartridge (shown in Table 2) will be compared with each other.

TABLE 1

| Parts | Error forming factors | |
|---|---|---|
| Electrophotographic photoreceptor | Outer diameter Coaxiality of inner and outer diameters | |
| | Inner diameter | Error in diameter difference |
| Flange | Outer diameter Coaxiality of inner and outer diameters | |
| | Inner diameter | Error in diameter difference |
| Print cartridge | Outer diameter of axis | |

TABLE 2

| Parts | Error forming factors | |
|---|---|---|
| Electrophotographic photoreceptor | Outer diameter | Error in diameter difference |
| Bearing member | Inner diameter Deflection of bearing member | |
| Print cartridge | Outer diameter Outer diameter of axis | Error in diameter difference |

It is understood from the tables that the invention is small in accumulation of errors m comparison to the conventional case, and as a result, the rotation error of the electrophotographic photoreceptor becomes small. Therefore, the problem of the tandem type image forming apparatus, i.e., it is advantageous in high speed operation, but in the case where images of respective color components are transferred and accumulated one by one on the same position of the image carrier, the registration of the images is difficult, can be resolved.

Furthermore, because the bearing member is fixed on the electrophotographic photoreceptor by clamping caused by insertion and fixing of the inserting members but not fixed by other measures, such as adhesion and crimping, the apparatus for fixing itself may have a simple constitution, and the fixing operation is also simple. Since the number of parts required for fixing is small, and the parts can be easily disassembled, the electrophotographic photoreceptor and the inserting member can be easily reused.

The electrophotographic photoreceptor is formed by a photosensitive layer on an outer surface of a cylindrical main substrate. The substrate of the electrophotographic photoreceptor is not particularly limited as far as it can be formed into a cylindrical form, and a metal, and particularly aluminum or stainless steel, is preferred taking formability, processability and strength into consideration.

The photosensitive layer formed on the outer surface of the substrate is not particularly limited, and a known photoconductive material can be formed into a film by a known method. It is preferred that the photosensitive layer contains an organic photoconductive material formed into a film using a resin as a base from the standpoint of environmental protection. The photosensitive layer mainly containing the organic photoconductive material includes a single layer type having both the charge generating function and the charge transporting function, and an accumulated layer type where the functions are borne by the separated plural layers, and both types may be used in the invention with the accumulated layer type being preferred.

It is preferred that an undercoating layer is provided on the surface of the substrate. Examples of the undercoating layer include various resins, such as an acrylic series, a methacrylic series, a vinylchloride series, a vinyl acetate series, an epoxy series, a polyurethane series, a phenol series, a polyester series, an alkyd series, a polycarbonate series, a silicone series and a melamine series, and the resins containing a zirconium compound or a titanium compound.

The photosensitive layer is provided on the outer surface of the substrate (or on the undercoating layer where the undercoating layer has been provided, hereinafter the same). The photosensitive layer is formed by coating a coating composition, which is prepared by dispersing and mixing a charge generating substance and/or a charge transporting substance with a binder resin and a solvent, on the outer surface of the substrate, followed by drying.

In the case where the photosensitive layer of the single layer type is formed, a coating composition, which is prepared by dispersing and mixing a charge generating substance, a charge transporting substance, a binder resin and a solvent, is coated on the outer surface of the substrate, followed by drying. In the case where the photosensitive layer of the accumulated layer type is formed, on the other hand, a coating composition for a charge generating layer prepared by dispersing and mixing a charge generating substance, a binder resin and a solvent, and a coating composition for a charge transporting layer prepared by dispersing and mixing a charge transporting substance, a binder resin and a solvent are separately provided, and the coating compositions are coated and dried one after another on the outer surface of the substrate to be accumulated.

Examples of the charge generating substance include an azo pigment, a disazo pigment, a quinone pigment, a quinocyanine pigment, a perylene pigment, an indigo pigment, a bisbenzoimidazole pigment, a phthalocyanine pigment, a quinacridone pigment, a pyrylium salt, an azulenium salt and a trigonal selenium.

Examples of the charge transporting substance include a compound having, in a main chain or a side chain, a skeleton of an aromatic compound, such as anthracene, pyrene, phenanthrene and coronene, and a nitrogen-containing compound, such as indole, carbazole, oxazole, isoxazole, thiazole, imidazole, pyrazole, oxadiazole, pyraziline, piaziazole and triazole, as well as a hole transporting substance, such as a hydrazone compound.

Examples of the binder resin for forming a coating film include polycarbonate, polyarylate, polystyrene, a polymethacrylic ester, a styrene-methyl methacrylate copolymer, polyester, a styrene-acrylonitrile copolymer, polysulfone, polyvinyl acetate, polyacrylonitrile, polyvinylbutyral, polyvinylpyrrolidone, methyl cellulose, hydroxymethyl cellulose and a cellulose ester.

As the solvent for forming the coating composition, a solvent having high volatility, the vapor of which has a larger density than air, is preferably employed, and examples thereof include n-butylamine, diethylamine, ethylenediamine, isopropanolamine, triethanolamine, N,N-dimethylformamide, acetone, methyl ethyl ketone, cyclohexanone, benzene, 4-methoxy-4-methylpentanone, dimethoxymethane, dimethoxyethane, 2,4-pentadione, anisole, methyl 3-oxobutanoate, monochlorobenzene, toluene, xylene, chloroform, 1,2-dichloroethane, dichloromethane, tetrahydrofuran, dioxane, methanol, ethanol, isopropanol, 1-butanol, ethyl acetate, butyl acetate, dimethyl sulfoxide, methyl cellosolve, ethyl cellosolve and methyl cellosolve acetate.

While an example where the cylindrical substrate is an electrophotographic photoreceptor is shown in the embodiment described in the foregoing, the invention can be applied to other rotatable cylindrical bodies, such as a developer sleeve and a fixing roll, and in these cases, the similar functions and effects as those in the embodiment can also be obtained.

EXAMPLE

A simple aluminum tube of A6063 having an outer diameter of 30.3 mm, an inner diameter of 28.5 mm and a length of 340 mm was prepared and turned off by a lathe to have an outer diameter of 30.0 mm. The tolerance after lathe processing is a h9 tolerance of from +0 to −0.55, i.e., from 29.945 to 30.000 mm.

The processed aluminum tube was used as a substrate, and a photosensitive layer was formed in the following manner.

Coating Composition A (Undercoating Layer)

| | |
|---|---|
| Zirconium compound (structural formula (1)) | 20 parts by weight |
| Silane coupling agent (structural formula (2)) | 2 parts by weight |
| Polyvinylbutyral resin | 2 parts by weight |

-continued

| | |
|---|---|
| (structural formula (3)) 1-Butanol | 70 parts by weight |

(1)

(organics ZC540 produced by Matsumoto Chemical Co., Ltd.)
(2) NH$_2$CH$_2$CH$_2$CH$_2$Si(OCH$_3$) (A-1100 produced by Nippon Unicar Co., Ltd.)
(3)

l > 709 (S-Lec BM-S produced by Sekisui Chemical Co., Ltd.) n = 4~6%

Coating Composition B (Charge Generating Layer)

A dispersion obtained by dispersing the following components in a sand mill using 1 mmΦ glass beads for 5 minutes:

| | |
|---|---|
| Chlorogallium phthalocyanine | 5 parts by weight |
| Vinyl chloride-vinyl acetate copolymer (structural formula (6)) | 5 parts by weight |
| n-Butyl acetate | 200 parts by weight |

(6)

Coating Composition C (Charge Transporting Layer)

| | |
|---|---|
| Charge transporting substance (structural formula (4)) | 1 part by weight |
| Polycarbonate resin (structural formula (5)) | 1 part by weight |
| Monochlorobenzene | 2 parts by weight |
| Tetrahydrofuran | 4 parts by weight |

(4)

(5)

(produced by Mitsubishi Gas Chemical Company, Inc.)

An undercoating layer was produced with the coating composition A to a dry film thickness of 1.0 μm (drying condition: 150° C., 10 minutes).

A charge generating layer was then produced with the coating composition B to a dry film thickness of 0.2 μm (drying condition: 100° C., 10 minutes).

A charge transporting layer was further produced with the coating composition C to a dry film thickness of 25 μm (drying condition: 120° C., 60 minutes).

As a bearing, a ball bearing 6806ZZ (produced by NSK Ltd.) having a nominal diameter of 30 specified by JIS was selected, which had an inner diameter of a bearing inner ring of 30 mm, an inner diameter of a bearing outer ring of 42 mm and a width of 7 mm. Two of the same bearings were prepared. The inner diameter tolerance of the bearing is from +0 to −0.01, which forms transition fitting as combined with the electrophotographic photoreceptor.

As shown in FIGS. 1 to 4, the parts were assembled in such a manner that the first inserting member was inserted at the outer periphery of the electrophotographic photoreceptor, and the second inserting member was then inserted into the opening of the first inserting member, while the third inserting member was inserted into the electrophotographic photoreceptor, and the fourth inserting member was inserted into the opening of the third inserting member, and as a result, the bearing was fixed to the electrophotographic photoreceptor.

The assembled electrophotographic photoreceptor having a bearing was measured for deflection as the bearing being center, which revealed that it was 25 μm.

The electrophotographic photoreceptor having a bearing was then installed in a print unit. As shown in FIGS. 5A and 5B, a print unit having a groove, into which the bearing was to be installed, was prepared. Internal screw holes were provided on both sides of the groove for fixing with screws (not shown in the figure). The bearing was mounted in the groove and retained with a retaining member from above, which was fixed with screws. A gap of about 0.5 mm was provided between the print unit and the retaining member.

Four sets of the print units were prepared. An exposing device modified to print out an image of a resolution of 2,400 dpi was installed in a full color tandem printer modified to contain the four sets of the print units, and an image of half tones of four colors was printed out. A good image quality was obtained as no color unevenness was observed.

The electrophotographic photoreceptor having a bearing was withdrawn from the print cartridge after the test, and could be easily disassembled into the bearing, the electrophotographic photoreceptor, the first inserting member and the second inserting member, by unhitching the screws.

The disassembled components were again assembled to conduct the test for image quality, and the similar good image quality as that before disassembling could be obtained.

COMPARATIVE EXAMPLE

The same electrophotographic photoreceptor as in Example 1 was prepared. A flange shown in FIGS. 6A and 6B and a flange having a gear of the similar structure were fixed on open ends of the electrophotographic photoreceptor with an adhesive. A member of an axis form was inserted in the hole of the flange of the electrophotographic photoreceptor, and the deflection thereof was measured, which revealed that it was 63 μm.

Four sets of the print units were prepared. An exposing device modified to print out an image of a resolution of 2,400 dpi was installed in a full color tandem printer modified to contain the four sets of the print units, and an image of half tones of four colors was printed out, which resulted in color unevenness.

The electrophotographic photoreceptor having a bearing was withdrawn from the print cartridge after the test, and the flange was tried to be detached. However, the adhesive remained inside the electrophotographic photoreceptor, and it was difficult to reuse the electrophotographic photoreceptor. The adhesive also remained on the flange, which was also difficult to be reused.

According to the method for fixing a bearing member for a cylindrical substrate and the structure for fixing a bearing member for a cylindrical substrate of the invention, rotation fluctuation caused by eccentricity of the cylindrical substrate can be suppressed by a simple operation and a simple structure.

According to the electrophotographic photoreceptor having a bearing member of the invention, rotation fluctuation caused by eccentricity of the electrophotographic photoreceptor can be suppressed by a simple operation and a simple structure, and deterioration in image quality caused by rotation deflection of the electrophotographic photoreceptor can be prevented.

According to the print cartridge and the apparatus for forming an image of the invention, rotation deflection of the electrophotographic photoreceptor is prevented, and particularly in a tandem type image forming apparatus, registration of images of respective color components can be maintained in an extremely good condition.

What is claimed is:

1. A method for fixing a bearing member to a cylindrical substrate comprising the steps of:
    providing a bearing member interdigitated on an outer periphery of a cylindrical substrate;
    inserting a first inserting member into the cylindrical substrate from an end of the cylindrical substrate, the first inserting member having an axial opening and prongs expandable radially;
    inserting a second inserting member axially into the axial opening of the first inserting member to clamp the bearing member interdigitated on the outer periphery of the cylindrical substrate to the cylindrical substrate by elastically expanding the prongs of the first inserting member and the cylindrical substrate radially outward.

2. A structure for fixing a bearing member to a cylindrical substrate comprising:
    a cylindrical substrate;
    a bearing member interdigitated on an outer periphery of the cylindrical substrate;
    a first inserting member having an axial opening and prongs expandable radially; and
    a second inserting member internally insertable into the axial opening of the first inserting member,
    wherein, upon insertion of the second inserting member into the axial opening of the first inserting member, the second inserting member engages and radially expands the prongs of the first inserting member along with the cylindrical substrate to clamp the bearing member to the cylindrical substrate.

3. The structure of claim 2, wherein:
    the second inserting member has a recessed portion for engaging the prongs of the first inserting member.

4. The structure of claim 2, wherein the prongs have a maximum thickness portion and the recessed portion of the second inserting portion mates with the maximum thickness portion to lock the second inserting member to the first inserting member.

5. An electrophotographic photoreceptor having a fixed bearing member, comprising:
    an electrophotographic photoreceptor;
    a bearing member interdigitated on an outer periphery of the electrophotographic photoreceptor;
    a first inserting member insertable into an axial end of the electrophotographic photoreceptor, the first inserting member having an axial opening and prongs expandable radially; and
    a second inserting member internally insertable into the axial opening of the first inserting member,
    wherein, upon insertion of the first inserting member into the electrophotographic photoreceptor and insertion of the second inserting member into the axial opening of the first inserting member, the second inserting member engages and radially expands the prongs of the first inserting member along with the cylindrical substrate to clamp the bearing member to the cylindrical substrate.

6. A print cartridge including the electrophotographic receptor of claim 5.

7. An image forming apparatus, including the electrophotographic receptor of claim 5.

8. The electrophotographic photoreceptor of claim 5, wherein:
    the second inserting member has a recessed portion for engaging the prongs of the first inserting member.

9. The electrophotographic photoreceptor of claim 5, wherein the prongs have a maximum thickness portion and the recessed portion of the second inserting portion mates with the maximum thickness portion to lock the second inserting member to the first inserting member.

10. The electrophotographic photoreceptor of claim 9, wherein the prongs have a thickness that gradually increases from axial ends to the maximum thickness portion, which is intermediate the axial ends a predefined length from a base of the first inserting member.

* * * * *